(12) United States Patent
Shin

(10) Patent No.: US 9,535,467 B2
(45) Date of Patent: Jan. 3, 2017

(54) POSITION CONTROL APPARATUS USING JOYSTICK

(71) Applicant: Jun Hyup Shin, Changwon-si (KR)

(72) Inventor: Jun Hyup Shin, Changwon-si (KR)

( * ) Notice: Subject to any disclaimer, the term of this patent is extended or adjusted under 35 U.S.C. 154(b) by 0 days.

(21) Appl. No.: 14/513,394

(22) Filed: Oct. 14, 2014

(65) Prior Publication Data

US 2015/0029101 A1    Jan. 29, 2015

Related U.S. Application Data

(63) Continuation of application No. PCT/KR2014/000002, filed on Jan. 2, 2014.

(30) Foreign Application Priority Data

May 9, 2013    (KR) .................. 10-2013-0052202

(51) Int. Cl.
| | |
|---|---|
| *G06F 1/16* | (2006.01) |
| *G05G 9/047* | (2006.01) |
| *G05G 5/03* | (2008.04) |

(52) U.S. Cl.
CPC ............... *G06F 1/169* (2013.01); *G05G 5/03* (2013.01); *G05G 9/047* (2013.01); *G05G 2009/04766* (2013.01)

(58) Field of Classification Search
CPC combination set(s) only.
See application file for complete search history.

(56) References Cited

U.S. PATENT DOCUMENTS

| | | | |
|---|---|---|---|
| 2008/0129691 A1* | 6/2008 | Armstrong | A63F 13/06 345/156 |
| 2009/0153370 A1* | 6/2009 | Cooper | G05G 9/047 341/21 |
| 2010/0011903 A1* | 1/2010 | Koschke | B62D 1/12 74/524 |

FOREIGN PATENT DOCUMENTS

| | | |
|---|---|---|
| KR | 10-1994-0000955 A | 1/1994 |
| KR | 10-0250156 B1 | 4/2000 |
| KR | 10-0362733 B1 | 11/2002 |
| KR | 10-0794762 B1 | 1/2008 |
| KR | 10-1124507 B1 | 2/2012 |

OTHER PUBLICATIONS

PCT International Search Report (PCT/KR2014/000002), Mar. 26, 2014.

* cited by examiner

*Primary Examiner* — Dwayne Bost
*Assistant Examiner* — Robert Michaud
(74) *Attorney, Agent, or Firm* — Park & Associates IP Law, P.C.

(57) ABSTRACT

Disclosed herein is a position control apparatus using a joystick, capable of restricting motion of an object when pressure acting on the object is sensed and the pressure is applied thereto. The position control apparatus using a joystick includes a stick unit, a sensing unit, a motor, and a pressing unit. The stick unit includes a stick bar which is capable of rotating about a point between one end and the other end thereof when a load is applied to one end thereof. The sensing unit senses a rotation position of the stick unit. The motor is driven when pressure is measured by a pressure sensor. The pressing unit applies pressure to the stick bar by driving the motor in proportional to the pressure measured (Continued)

by the pressure sensor, so as to prevent the stick bar from rotating in an increasing direction of the pressure.

6 Claims, 7 Drawing Sheets

POSITION CONTROL APPARATUS USING JOYSTICK

REFERENCE TO RELATED APPLICATIONS

This is a continuation of pending International Patent Application PCT/KR2014/000002 filed on Jan. 2, 2014, which designates the United States and claims priority of Korean Patent Application No. 10-2013-0052202 filed on May 9, 2013, the entire contents of which are incorporated herein by reference.

FIELD OF THE INVENTION

The present invention relates to a position control apparatus capable of controlling a position of an object using a joystick, and more particularly, to a position control apparatus using a joystick, capable of restricting motion of an object when pressure acting on the object is sensed and the pressure is applied thereto.

BACKGROUND OF THE INVENTION

A joystick is utilized to control a robot arm or a position of an object. That is, the position of the object or robot arm is controlled by moving the joystick. When an operator rotates the joystick, the rotated position of the joystick is detected to thereby allow the robot arm to be controlled by moving the robot arm in proportional to a movement distance of the joystick.

Korean Patent Laid-Open Publication No. 10-1994-0000955 discloses a joystick and a position detection method using the same, and Korean Patent Laid-Open Publication No. 10-1999-0061783 discloses a method of driving an object by operation of a joystick.

In the related art, in a case of controlling the object or the robot arm by moving the joystick, an operator may visually identify that an object comes into contact with another object so as to apply pressure thereto, but may not sense the same. Accordingly, when the operator continues to operate the joystick in a state of not visually identifying the same, pressure may be excessively applied to the robot arm. In this case, there is a problem in that the robot arm may be damaged due to an excessive load applied thereto.

SUMMARY OF THE INVENTION

Accordingly, the present invention is directed to a position control apparatus using a joystick that substantially obviates one or more problems due to limitations and disadvantages of the related art.

An object of the present invention is to provide a position control apparatus using a joystick, in which an operator operates a joystick, when pressure is applied to an object and is transferred to the operator, and may sense the pressure.

Another object of the present invention is to provide a position control apparatus using a joystick, capable of physically restricting motion of an object when pressure is applied to the object and is transferred to the operator.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an aspect of the present invention, a position control apparatus using a joystick includes a stick unit, a sensing unit, a motor, and a pressing unit. The stick unit includes a stick bar which is capable of rotating about a point between one end and the other end thereof when a load is applied to one end thereof. The sensing unit senses a rotation position of the stick unit. The motor is driven when pressure is measured by a pressure sensor. The pressing unit applies pressure to the stick bar by driving the motor in proportional to the pressure measured by the pressure sensor, so as to prevent the stick bar from rotating in an increasing direction of the pressure.

In the position control apparatus, the pressing unit may restrict an angle of rotation of the stick bar in proportional to the pressure measured by the pressure sensor.

In the position control apparatus, the stick bar of the stick unit may be formed with a ball at the point thereof. In this case, the stick unit may further include a housing coupled with the ball such that one end of the stick bar is inserted into the housing while the other end thereof is exposed and the stick bar is capable of rotating about the ball.

In the position control apparatus, the housing may be formed, at an upper portion thereof, with a protrusion enclosing the stick bar such that the stick bar is capable of rotating about the ball. In this case, the pressing unit may include a first gear which encloses the protrusion and is screwed to the protrusion, a second gear which is rotated by the motor and engages with the first gear so as to adjust a distance between the first gear and one end of the stick bar by moving the first gear along the protrusion, and a spring which is supported, at one end thereof, by the stick bar and is contracted by the first gear so as to apply force to the stick bar when the first gear moves to one end of the stick bar.

In the position control apparatus, the pressing unit may further include an annular ring which supports the other end of the spring so as to slide on an upper portion of the first gear and encloses the stick bar.

In the position control apparatus, the sensing unit may include a magnet coupled to the other end of the stick bar, and a plurality of magnetic sensors mounted to the housing so as to sense a position of the magnet.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
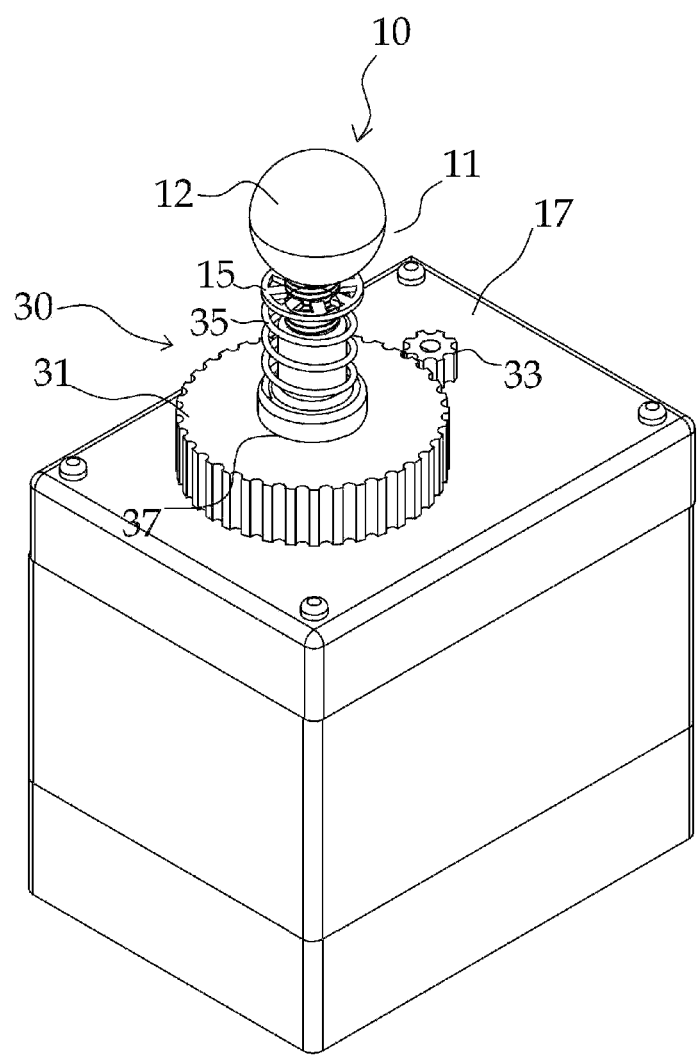
FIG. 1 is a perspective view illustrating a position control apparatus using a joystick according to an embodiment of the present invention.
Figure 2:
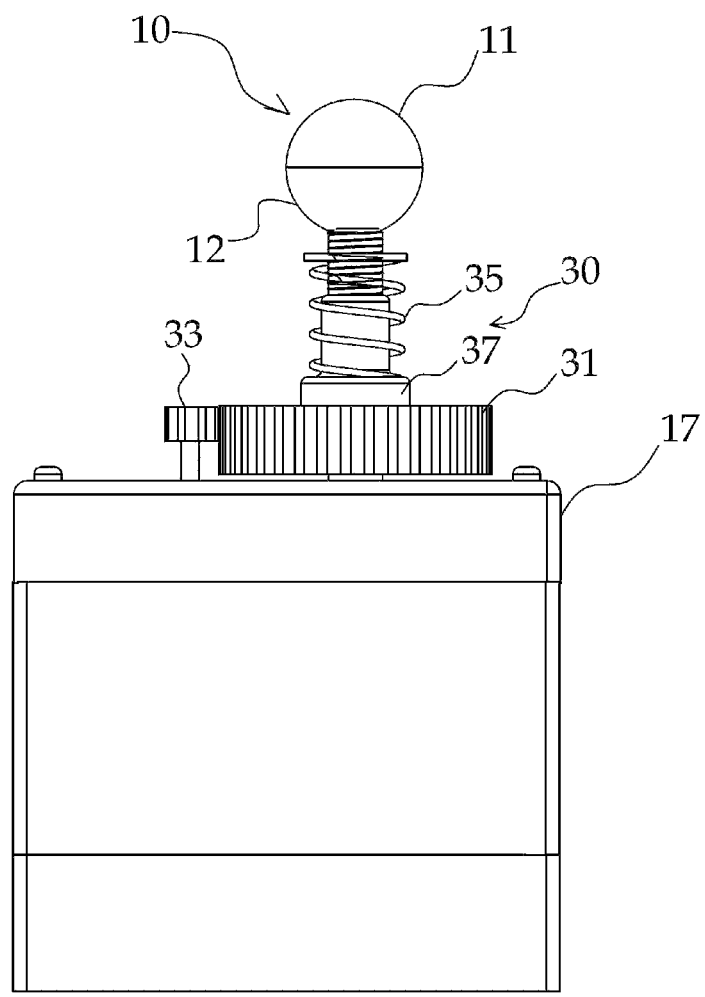
FIG. 2 is a rear view illustrating the position control apparatus using a joystick shown in FIG. 1.
Figure 3:
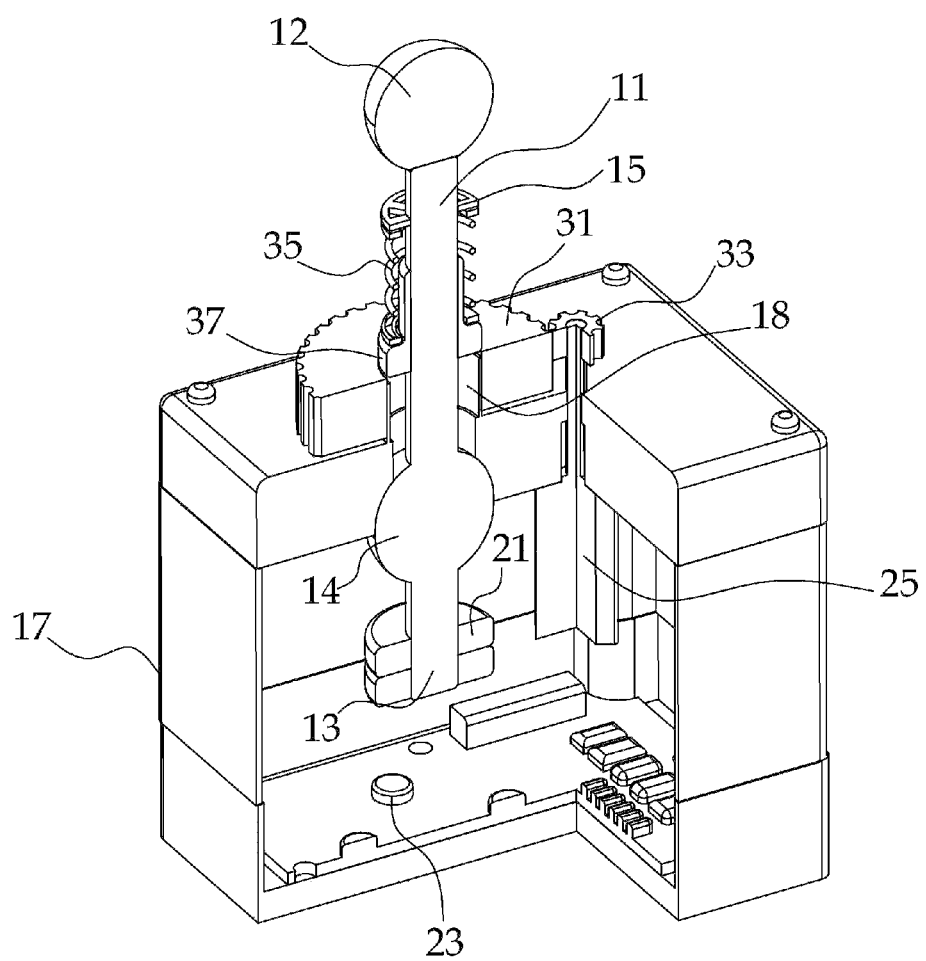
FIG. 3 is a partially cut perspective view illustrating the position control apparatus using a joystick shown in FIG. 1.
Figure 4:
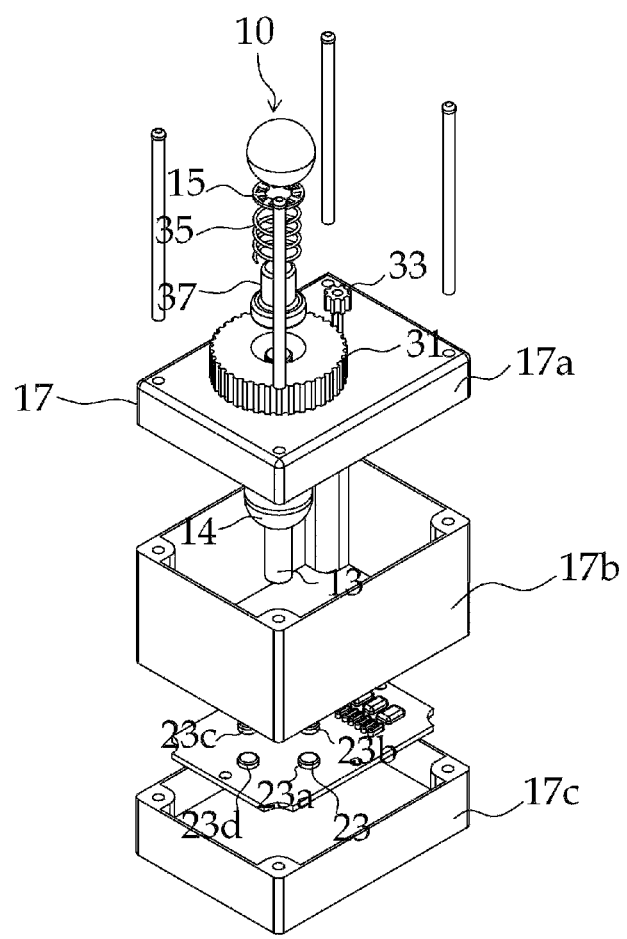
FIG. 4 is an exploded perspective view illustrating the position control apparatus using a joystick shown in FIG. 1.
Figure 5:
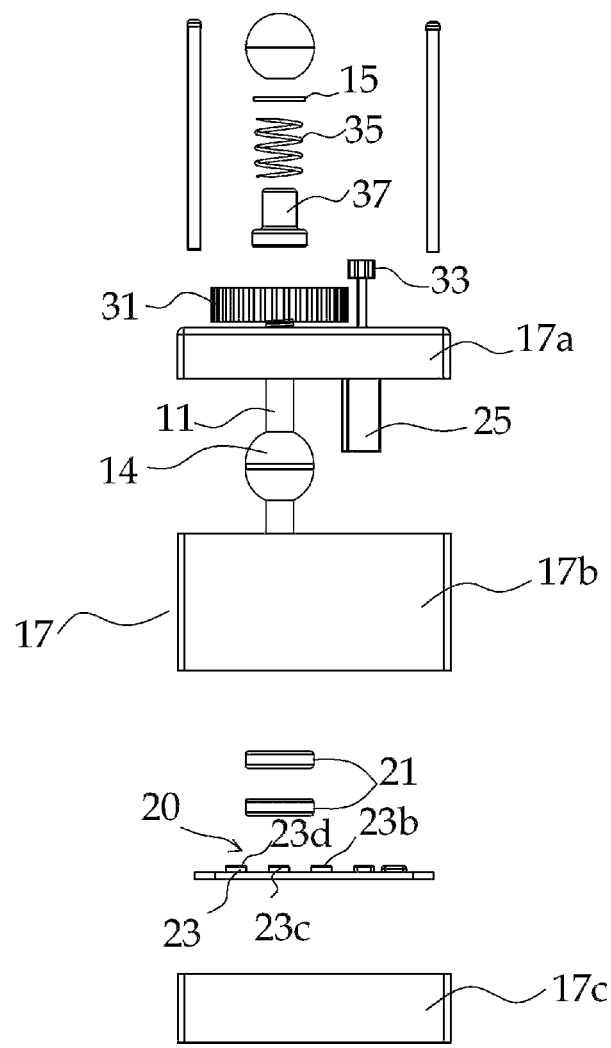
FIG. 5 is an exploded front view illustrating the position control apparatus using a joystick shown in FIG. 1.

A position control apparatus using a joystick according to an exemplary embodiment of the present invention will be described below in more detail with reference to FIGS. 1 to 7.

The position control apparatus using a joystick according to the embodiment of the present invention includes a stick unit 10, a sensing unit 20, a motor 25, and a pressing unit 30.

The stick unit 10 includes a stick bar 11 and a housing 17.

The stick bar 11 is formed with a ball 14 between one end 12 and the other end 13 thereof. A protruding support piece 15 is provided between the ball 14 and one end 12 of the stick bar 11.

The housing 17 is formed with a through-hole such that one end 12 of the stick bar 11 may be exposed to the outside and the other end 12 thereof may be inserted thereinto. In addition, the housing 17 is formed with a protrusion 18 protruding to the outside so as to enclose the stick bar 11 in the through-hole. The ball 14 is coupled to the through-hole such that the stick bar 11 may rotate about the ball 14. Since the stick bar 11 has to rotate, a certain distance is provided between the protrusion 18 and the stick bar 11. Accordingly, when an operator grips one end 12 of the stick bar 11 and moves the same, the stick bar 11 rotates about the ball 14 and thus the other end 13 thereof moves.

When the stick bar 11 rotates about the ball 14, the sensing unit 20 serves to measure an angle of rotation thereof. To this end, the sensing unit 20 includes a magnet 21 and a plurality of magnetic sensors 23. The magnet 21 is coupled to the other end 13 of the stick bar 11.

The magnetic sensors 23 are installed on the bottom of the housing 17 so as to sense a position of the magnet 21. In the present embodiment, four magnetic sensors 23a, 23b, 23c, and 23d are installed to sense the position of the magnet 21. That is, since the position of the magnet 21 varies during rotation of the stick bar 11, a magnetic field is changed. The position of the magnet 21 may be sensed by measuring a magnetic field using the four magnetic sensors 23a, 23b, 23c, and 23d. Consequently, it may be possible to calculate the movement distance of the other end 13 of the stick bar 11 and the angle of rotation of the stick bar 11. When the movement distance of the other end 13 of the stick bar 11 is calculated by the sensing unit 20, it may be possible to move a robot arm or an object in proportional to the movement distance of the stick bar 11. In this case, if the robot arm or the object moves and comes into contact with another object, pressure thereof is measured by a pressure sensor (not shown). When the stick bar 11 continues to rotate, the pressure continues to increase.

When the pressure is measured by the pressure sensor, the motor 25 is driven. That is, the motor 25 is driven when the pressure is transferred from the pressure sensor thereto.

The pressing unit 30 serves to apply pressure to the stick bar 11 by driving the motor 25 in proportional to the pressure measured by the pressure sensor and to restrict an angle of rotation of the stick bar 11 in proportional to the pressure measured by the pressure sensor, so as to prevent the stick bar 11 from rotating in an increasing direction of the pressure.

To this end, the pressing unit 30 includes a first gear 31, a second gear 33, a spring 35, and an annular ring 37.

The first gear 31 is screwed to the protrusion 18 while enclosing the protrusion 18. Accordingly, when the first gear 31 rotates, the first gear 31 may move along the protrusion 18 in a direction indicated by an arrow 1 or an arrow 3.

The second gear 33 is rotatably coupled to the motor 25 and engages with the first gear 31. Accordingly, when the second gear 33 rotates, the first gear 31 moves along the protrusion 18 during rotation thereof.

The spring 35 is mounted between the support piece 15 and the first gear 31 such that one end of the spring 35 is supported by the support piece 15 of the stick bar 11.

The annular ring 37 is located at an upper portion of the first gear 31 and supports the other end of the spring 35, so as to slide on the upper portion of the first gear 31. Accordingly, when the first gear 31 is raised, the annular ring 37 is raised so that the spring 35 is contracted. When the first gear 31 is dropped, the annular ring 37 is dropped so that the spring 35 is returned to an original form.

Figure 6:
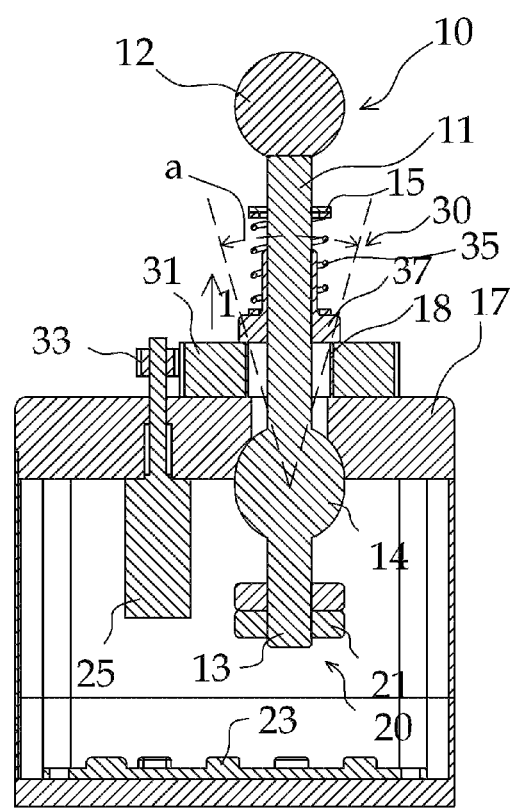
FIG. 6 is a cross-sectional view illustrating the position control apparatus using a joystick shown in FIG. 1.
Figure 7:
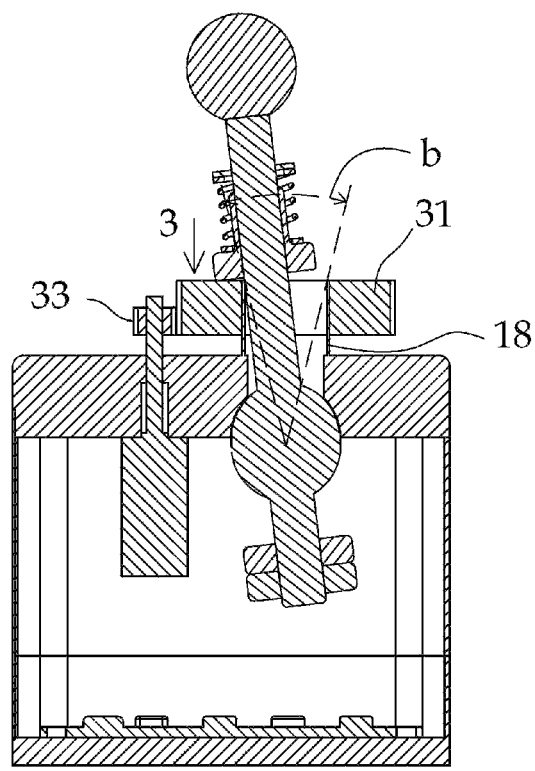
FIG. 7 is a cross-sectional view illustrating an operated state of the position control apparatus using a joystick shown in FIG. 1.

Hereinafter, operation of the position control apparatus using a joystick according to the embodiment will be described with reference to FIGS. 6 and 7. When the first gear 31 is not raised, the stick bar 11 may rotate by an angle a shown in FIG. 6. When pressure is sensed by the pressure sensor during rotation of the stick bar 11 and the motor 25 operates, the second gear 33 rotates so that the first gear 31 is raised in a direction of an arrow 1. The spring 35 is then contracted as shown in FIG. 7. When the spring 35 is contracted, the spring 35 applies pressure to the support piece 15. Therefore, the pressure is transferred to the stick bar 11 and is sensed by the operator. The operator may rotate the stick bar 11 only when applying larger force to the stick bar 11 for rotation thereof, thereby allowing the object to move. Accordingly, it is more difficult to rotate the stick bar 11. Meanwhile, since the first gear 31 is raised in this state, the stick bar 11 may rotate by an angle b. Thus, an angle of the stick bar to be rotated is decreased. Accordingly, when the first gear 31 is raised, the angle of rotation of the stick bar 11 is restricted and the spring 35 is contracted so as to apply pressure to the stick bar 11. Therefore, it is difficult to rotate the stick bar 11.

When the stick bar 11 moves to be returned, the pressure measured by the pressure sensor is decreased. Therefore, the motor 25 reversely rotates and the first gear 31 moves in a direction of an arrow 3. Consequently, since the spring 35 is returned to an original length, the pressure acting on the stick bar 11 is decreased and the angle capable of rotating the stick bar 11 is increased as shown in FIG. 6.

Accordingly, in accordance with the present embodiment, when the pressure is applied to the pressure sensor, it may be possible to restrict the angle of rotation of the stick bar 11 and to hinder rotation of the stick bar 11 by applying pressure thereto.

As is apparent from the above description, in accordance with a position control apparatus using a joystick of the present invention, when pressure is sensed by rotation of a stick bar, a motor operates to rotate a first gear and a second gear. A spring is then contracted to apply pressure to the stick bar. Consequently, pressure is transferred to an operator operating the stick bar, thereby enabling the operator to sense the pressure. In this case, since a load required for moving the object is larger than that for moving the stick bar, incorrect operation of the operator may be prevented.

In addition, when pressure is sensed, the first gear moves to physically restrict an angle of rotation of the stick bar. That is, it may be possible to prevent the stick bar from excessively rotating.

Although the present invention has been described with respect to the illustrative embodiments, it will be apparent to those skilled in the art that various variations and modifications may be made without departing from the spirit and scope of the invention as defined in the following claims.

What is claimed is:

1. A position control apparatus using a joystick, comprising:
    a housing;
    a stick unit comprising a stick bar extending between a first end outside of the housing and a second end within the housing, the stick bar being capable of rotating about a pivot point between the first end and the second end of the stick bar when a load is applied to the first end thereof;
    a sensing unit disposed adjacent to the second end of the stick bar and capable of detecting a rotation position of the stick unit by sensing a position of the second end of the stick bar;
    a spring coupled to the stick bar at position outside of the housing;
    a motor which is driven when pressure is measured by a pressure sensor;
    a displaceable member coupled to the stick bar at position above the pivot point thereof and having the spring positioned between the first end of the stick bar and the displaceable member; and
    a pressing unit which applies pressure to the stick bar by driving the motor in proportional to the pressure measured by the pressure sensor as the displaceable member moves outwardly along the stick bar by operation of the motor while causing the spring coupled to the stick bar to be contracted, so as to restrict the stick bar from excessively rotating in an increasing direction of the pressure.

2. The position control apparatus according to claim 1, wherein the pressing unit restricts an angle of rotation of the stick bar in proportional to the pressure measured by the pressure sensor.

3. The position control apparatus according to claim 2, wherein:
    the stick bar includes a ball located at the pivot point thereof; and
    the housing is coupled with the ball such that the stick bar is capable of rotating about the ball.

4. The position control apparatus according to claim 3, wherein:
    the housing is formed, at an upper portion thereof, with a protrusion having an inner cavity for enclosing the stick bar therein such that the stick bar is capable of rotating about the ball; and
    the displaceable member is in form of a first gear which has the protrusion screw-coupled thereto, wherein the first gear is coupled to a second gear which is rotated by the motor so as to adjust a distance between the first gear and the first end of the stick bar by moving the first gear along the protrusion, and the spring is supported by the stick bar and is contracted by the first gear so as to apply force to the stick bar when the first gear moves toward the first end of the stick bar.

5. The position control apparatus according to claim 4, wherein the pressing unit further comprises an annular ring which supports the other end of the spring so as to slide on an upper portion of the first gear and encloses the stick bar.

6. The position control apparatus according to claim 1, wherein the sensing unit comprises:
    a magnet coupled to the second end of the stick bar; and
    a plurality of magnetic sensors mounted to the housing so as to sense a position of the magnet.

* * * * *